(12) United States Patent
Balter et al.

(10) Patent No.: US 6,660,212 B1
(45) Date of Patent: Dec. 9, 2003

(54) CONSTRAINED POST CURE INFLATION

(75) Inventors: David John Balter, Cuyahoga Falls, OH (US); Michael Alois Kolowski, Mogodore, OH (US); Anthony J. Scarpitti, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 237 days.

(21) Appl. No.: 09/715,277

(22) Filed: Nov. 17, 2000

(51) Int. Cl.$^7$ .............................................. B29D 30/06
(52) U.S. Cl. ...................... 264/501; 264/236; 264/237; 425/58.1
(58) Field of Search .......................... 156/110.1, 130.5; 264/502, 501, 236, 237, 348; 425/58.1; 73/146

(56) References Cited

U.S. PATENT DOCUMENTS

| | | |
|---|---|---|
| 2,963,737 A | 12/1960 | Soderquist |
| 3,017,669 A | 1/1962 | Mikell |
| 3,039,839 A | 6/1962 | Waters et al. |
| 3,120,571 A * | 2/1964 | Wolfer ........................ 264/502 |
| 3,389,193 A | 6/1968 | Hughes |

(List continued on next page.)

FOREIGN PATENT DOCUMENTS

| | | |
|---|---|---|
| DE | 1729614 | 6/1971 |
| EP | 0888872 | 1/1999 |
| FR | 1301218 | 7/1962 |

*Primary Examiner*—Goeffrey L. Knable
(74) *Attorney, Agent, or Firm*—Howard M. Cohn

(57) ABSTRACT

Method and apparatus for constrained post cure inflation (CPCI), for improvement of tire uniformity, footprint shape factor, and tread wear. The method comprises the steps of: (1) initiating the method on a tire after the tire has been removed from a tire curing mold (preferably while the tire is still hot); (2) providing 360 degree circumferential tread restraint which holds the tread in an ideal tread shape, concentric to the axis of rotation and nominally perpendicular to the equatorial plane; (3) sealingly holding the beads concentric to, and equidistant from, the axis of rotation, and symmetrically spaced about the equatorial plane; and (4) inflating the tire to a controlled pressure, and holding the controlled pressure for a controlled time while the tread is restrained and the beads are sealingly held. Optional additional steps include: before the inflating step, heating the tire, preferably to a controlled temperature above a glass transition temperature of the tire's ply cord material; and before the end of the controlled time, cooling the tire below the glass transition temperature. An apparatus (CPCI device) is disclosed which is suitable for implementing the inventive method.

19 Claims, 6 Drawing Sheets

U.S. PATENT DOCUMENTS

| | | |
|---|---|---|
| 3,464,264 A | 9/1969 | French |
| 3,529,048 A | 9/1970 | Kovac |
| 3,605,182 A | 9/1971 | Ulm |
| 3,632,701 A | 1/1972 | Devitt et al. |
| 3,635,610 A | 1/1972 | Hall et al. |
| 3,725,163 A | 4/1973 | Hofelt, Jr. |
| 3,838,142 A | 9/1974 | Hochstein |
| 3,848,368 A | 11/1974 | Toshioka et al. |
| 3,865,527 A | 2/1975 | McGehee et al. |
| 3,872,208 A | 3/1975 | Brown et al. |
| 3,880,556 A | 4/1975 | Brown et al. |
| 3,926,704 A | 12/1975 | Sharp, Jr. |
| 3,945,277 A | 3/1976 | McGehee et al. |
| 3,948,004 A | 4/1976 | Gruber |
| 4,095,374 A | 6/1978 | Ugo |
| 4,173,850 A | 11/1979 | Gormish et al. |
| 4,420,453 A | 12/1983 | Ayers |
| 4,458,451 A | 7/1984 | Rogers et al. |
| 4,628,978 A | 12/1986 | Imai et al. |
| 4,736,546 A | 4/1988 | Ugo |
| 4,767,480 A | 8/1988 | Goldstein |
| 4,936,054 A | 6/1990 | Rogers et al. |
| 5,022,186 A | 6/1991 | Rogers, Jr. |
| 5,060,510 A | 10/1991 | Rousseau |
| 5,225,138 A | 7/1993 | Irie |
| 5,365,781 A | 11/1994 | Rhyne |
| 5,384,084 A | 1/1995 | Siegenthaler |
| 5,441,393 A | 8/1995 | Fujieda et al. |
| 5,458,176 A | 10/1995 | Rhyne |
| 5,616,859 A | 4/1997 | Rhyne |
| 5,698,064 A | 12/1997 | Fujimoto |
| 5,853,648 A | 12/1998 | Cleveland |
| 5,879,484 A | 3/1999 | Spragg et al. |
| 5,882,452 A | 3/1999 | Sakamoto et al. |
| 6,203,748 B1 * | 3/2001 | Kumagai .................... 264/502 |

* cited by examiner

CONSTRAINED POST CURE INFLATION

CROSS-REFERENCE TO RELATED APPLICATIONS

This application relates to U.S. patent application Ser. No. 09/715,384 entitled POST CURE CORRECTION OF TIRE UNIFORMITY, having a filing date concurrently herewith.

TECHNICAL FIELD

The present invention relates to manufacturing pneumatic tires, and, more specifically, to a method and apparatus to improve or correct tire uniformity.

BACKGROUND

A typical radial tire includes a tread, a belt structure ("belts") and a carcass. The carcass has an innerliner, a pair of inextensible beads, an apex (rubber filler) over each bead, two sidewalls, and one or more plies ("radial plies"). The plies have parallel reinforcing ply cords of typically nylon or polyester, which extend between, and wrap around, the beads.

Tire Making Process

In the tire making process, a green carcass ("green" meaning as yet uncured and still tacky) is built typically by wrapping a length of green innerliner and at least one radial ply over a "first stage building drum" and splicing the innerliner and ply ends together to form a cylindrical shape around the building drum. Two beads (each comprising a cable of steel filaments encased in green rubber) are then positioned over the carcass, one at each side. The portions of the ply that extend beyond the beads are then turned up (wrapped around) the beads, forming "ply turnups". The resulting assembly, including the innerliner, ply, and beads, is called a green carcass. Then, green (uncured) sidewalls are applied around each side of the plies.

The green carcass is removed from the first stage building drum and mounted on a "second stage machine" where it is inflated to a toroidal shape, and its radially-outer surface is pressed against a green tread and belt package to form a "green tire". In subsequent steps, the green tire is "stitched" (rolled with a roller) to remove air pockets and adhere internal surfaces together.

The green tire is then mounted in a curing mold, where a bladder is blown up within the tire cavity to press the tire's outer surface tightly against the mold's inner walls while the tire is vulcanized. In the mold, the tire's green rubber initially softens under heat but eventually cures (stiffens through polymerization) enough to be removed from the mold and allowed to cool outside the mold, where the curing reaction continues until the tire is cool. In some cases, the tire is inflated on a post-cure inflation stand ("PCI stand") while cooling, to keep the tire shape uniform and the ply uniformly stretched, to prevent the ply from shrinking nonuniformly when the tire is still hot from the mold.

Uniformity Characteristics

After a tire is cured, it is typically tested for uniformity characteristics, such as radial runout, radial force variation, axial force variation, tangential force variation, and conicity, which are defined in the Definition Section hereinbelow.

Sources Of Nonuniformity

Tire nonuniformity emanates from numerous factors in the tire making process, listed below in their order of occurrence in the tire building sequence:

Deformation Of Raw Components: The raw tire components (tread, sidewall innerliner, plies [ply cords], beads and belts) either are rubber or have a rubber matrix and are stored on long rolls in the deformable green state. So, the tire components may not remain uniformly thick during storage.

Nonuniform Placement On Building Drum: The ply cords may not be laid around the building drum with equal straightness and tension, and the two beads may not be positioned in a plane which is perfectly perpendicular to the drum (and tire) axis, or may otherwise not be parallel to each other over the ply on the building drum.

Nonuniform Placement On Second Stage Machine: On the second stage machine, if the belt and tread are not positioned symmetrically over the green carcass, the green tire, and hence the cured tire, will not be uniform. Also, later as the green rubber is blown up, the bead and ply positions can shift nonuniformly.

Components Shift In The Green Tire State: Before curing, the beads and plies are held in place only by their green rubber matrix and the surrounding green rubber. As the green tire is handled, the bead and ply positions can shift nonuniformly.

Nonuniform Mounting In The Mold: If the green tire is not positioned symmetrically within the mold, the finished tire will not be uniform.

Ply Splice: The ply is stiffer and heavier at its splice (where it is doubled due to the overlapping ply ends) compared to other locations.

Ply Stretching and Shrinkage: In the mold, the inflated bladder tensions (stretches) the ply outward, and heat shrinkage of the ply's nylon or polyester fibers tension the ply further. This tension (tensile stress) causes the ply to slip around the bead, but to a different extent at different locations around the bead, with a splice slipping around the bead least.

Nonuniform Curing: The rubber can "lock up" (stiffen under cure) around the ply at different times at different locations, thus locking in nonuniform ply stresses.

TUM Apparatus

After a tire is cured and cooled, it is tested on a force variation machine (also called "tire uniformity machine" abbreviated "TUM", "tire uniformity inspecting machine", and "tire uniformity apparatus"). Many patents describe TUM components and TUM designs, almost all of which share the same general principle of operation as follows:

The tire is mounted on a rotatable test rim. To ease mounting, the test rim is a "split rim" having two rim halves with flanges that come together to sealingly engage the tire's bead area. The tire is inflated and pressed against a rotatable load drum (also called "load-wheel", "load roll" or "test drum") whose axis is parallel with the tire axis. As the tire rotates against the load drum, force sensors (usually connected to the drum shaft) or displacement sensors measure changes in force (of tire against the drum) or displacement (of the tire surface from the nominal or at rest tire surface location) in various directions (mainly radial and axial).

TUM designs vary as to whether the load drum rotates the tire or vice versa, tire rotational speed, which uniformity characteristics are tested, how to correct for deformities or nonuniformities in the test rim or load drum, how to correct for sensor errors due to TUM vibration, and how to correct for tire imbalance. Designs also vary on rim design and tire conveyance mechanism.

FIGS. 4A and 4B illustrate simplified results of a TUM test, using radial force variation (RFV) as an example. FIGS.

4A and 4B show radial force on the vertical axis 401 versus the tire's rotational angle from 0 to 360 degrees on the horizontal axis 402. FIG. 4A shows a force variation composite curve 405. The angular location 410 (corresponding to a circumferential location on the tread) of greatest force 411 represents a "hard spot", where the tire presses hardest against the load drum. The angular location 420 of least force 421 represents a "soft spot", where the tire presses least against the load drum. The force variation composite curve 405 can be "decomposed" as shown in FIG. 4B into a series ("Fourier series") of constituent harmonic waveforms 431, 432, 433 for further mathematical analysis. The first harmonic 431 of radial force variation (abbreviated R1h) is also known as "radial runout." A second harmonic waveform 432 and third harmonic waveform 433 are also illustrated.

With the data thus collected, there are a wide variety of methods for mathematically processing the force variation data to determine the need for uniformity correction and to determine the control parameters for correcting a tire on a uniformity correction machine (which may be the same as the TUM used to make the uniformity measurements).

Prior Art Correction Methods

Grinding

In the patent literature, the most commonly addressed method of correcting a uniformity characteristic is grinding off rubber from selected locations around the tread circumference (and/or possibly the tread shoulder or tire sidewalls). Numerous patents disclose a wide variety of grinding techniques, differing on how the grinder is interfaced with the TUM, when grinding occurs relative to testing, where laterally on the tread (shoulder, crown, etc.) to grind, and how to calculate from force variation data the grinding depth at each angular location (U.S. Pat. Nos. 5,022,186; 4,936,054; 4,736,546; 4,458,451; 4,173,850; 4,095,374; 3,948,004; 3,880,556; and 3,848,368). Disadvantages of grinding are that it contributes to environmental pollution and material waste, reduces tread life, and leaves an unattractive surface finish. Although grinding can eliminate dimensional nonuniformities, it is less able to alleviate internal stress nonuniformities.

Work Out the Nonuniformities; Hot from mold; Inflated

U.S. Pat. NO. 3,529,048 discloses a method to improve stress uniformity of tire cords and to reduce circumferential variations in structural resistance to radial and lateral forces when rotating. A tire is mounted on a rim shortly after removal from the vulcanizing mold while being approximately the vulcanizing temperature, and inflated to typically 20–40 psig. While the tire cools, the tire is rotated against an applied load for one to two times the vulcanizing duration. In variations of the invention, the load can be axial against the tread, lateral against the sidewall, or oblique against the tread, shoulder or sidewall. In other variations, the load can be rolling contact (such as a rotating shaft) or sliding contact. The load surface can be curved (ex: shaft) or planar (ex: floor), smoothly cylindrical or contoured. There can be one or a plurality of shafts (loads).

Rotatingly Pressing Around Tire's Entire Circumference When Hot U.S. Pat. Nos. 3,635,610; 3,529,048; 3,464,264 and 3,389,193 disclose various methods to improve uniformity characteristics, all based on rotating a cured or partially-cured tire while pressing it against a roller, to "run in", "knead", and/or "buckle" the tire's surface around its entire circumference, to alleviate nonuniform stresses. The patents differ as to whether this is done when the tire is still hot from the mold, reheated, or made hot by flexural heating. They also differ as to whether this is done while the tire is inflated or uninflated.

Post-Cure Inflation

Various patented methods (e.g., U.S. Pat. Nos. 4,420,453 and 2,963,737) of improving uniformity of a cured tire are based on "post-cure inflation" ("PCI" or "post-inflation"), defined as mounting a hot cured tire (soon after removal from the curing mold, before it has cooled down from the curing process in the mold) on a rim and keeping it inflated as it cools. The patented methods differ as to the inflation pressure, whether to spray-cool, and when to start and end the post-inflation. Although these processes are referred to as "post-cure" processing, in reality a tire generally continues to cure as it cools down after removal from the curing mold.

Heating Selected Tire Portions While Uninflated

U.S. Pat. Nos. 3,945,277; 3,880,556; 3,872,208; 3,865,527 and 3,632,701 disclose various methods of reducing nonuniformities and/or flat spots of a cured tire based on heating only selected portions of the tire while uninflated.

Rotating Uninflated After Molding

U.S. Pat. No. 5,853,648 discloses a device for cooling tires, which minimizes static stress. The tire is rotated in a vertical position, uninflated, while cooling after vulcanization.

Reduce Bead Spacing; PCI When Hot off the Mold

U.S. Pat. No. 3,039,839 discloses a method of solving tire shrinkage and distortion caused by shrinkage of nylon ply cords. The bead set (bead spacing when on a building drum) is narrowed (relative to the prior art) to increase the molding stretch during molding and impart a tire molding stretch to the cords. Upon removal from the mold, the tire is promptly mounted on an inflating rim (PCI stand) and kept inflated to typically 30 lbs until it cools to below the nylon cord's shrinkage temperature of about 200 F.

Ionizing Radiation

U.S. Pat. No. 3,838,142 discloses correcting radial force variation by irradiating soft-spot sections of the tread and/or sidewalls with ionizing radiation of high energy electrons.

Material Addition

U.S. Pat. No. 3,725,163 discloses reducing force variations by applying a small amount of adhering material to selected locations of the tread, which can be in the form of a spray or tape or applied by a marker.

Shims

U.S. Pat. No. 5,060,510 discloses correcting radial force variation by inserting circular ring wedges of circumferentially-variable thickness (serving as shims) between the rim and the tire's bead area.

Stretch Ply Cords

U.S. Pat. No. 5,365,781 (and its divisions U.S. Pat. No. 5,616,859 and 5,458,176) disclose a method and apparatus to correct uniformity characteristics in a cured radial tire by permanently deforming a portion of a carcass reinforcing member (i.e., selected ply cords) as a function of the magnitude of the uniformity characteristic. A significantly high inflation pressure permanently stretches the portion of the carcass reinforcing member beyond its elastic limit and permanently lengthens it to an extent that is inversely related to a restraint (applied by a pair of [sidewall] restraint rings [182 in FIG. 8]) at that location. Radial force variation and/or conicity may be corrected by varying the angles between the plane of each restraint ring and the plane of the tire sidewall and by applying differing amounts of restraint to the two sidewalls. A belt restraint ring (280 in FIG. 8) can be used to prevent the high inflation pressure from expanding the belt package. An alternate embodiment corrects force variation by mechanically (instead of by inflation pressure) stretching a portion of the carcass reinforcing member outwardly beyond its elastic limit. The described correction process is utilized after a tire uniformity test is performed on a tire, so that placement of the restraint(s) can be determined from the TUM test results on the tire.

Disadvantages of these methods are that the restraint rings are most capable of adjusting cord lengths for one hard spot and one soft spot which is approximately 180 degrees around the tire from the hard spot, however use of a cupped restraint ring (380) and multiple inflation pressure cycles is proposed for correction of composite radial force variation defects. Furthermore, the belt restraint ring can not force any kind of concentricity between the tread and the beads or the tire axis.

PCI with Variable Rim Width and Inflation Pressure

European Patent 888,872 discloses measuring a waveform of radial runout before vulcanization. In a first embodiment, immediately after vulcanization, the tire is post cure inflated (to elongate the ply cords) at a high temperature on a rim whose rim width is minimum at a location corresponding to the wave form peak. In a second embodiment, immediately after vulcanization, the tire is post cure inflated (to elongate the ply cords) at a high temperature, while restraining jigs are disposed against the tire shoulders (FIG. 10).

Pre-cure Methods

Adjust Belt Position over Green Carcass: U.S. Pat. No. 3,926,704 discloses measuring conicity of a (green) un-vulcanized tire and adjusting the location of the belts accordingly while on a tire building machine.

Adjust Tire Shaping when Green: U.S. Pat. No. 5,882,452 discloses measuring vertical deviation of a green tire from circularity while clamped on a green tire building drum, and then shaping the green tire into a complete circle according to the measured value.

U.S. Pat. No. 5,882,452 and 3,926,704 disclose methods of measuring and correcting nonuniformity before curing, and E.P. 888,872 discloses methods requiring measuring nonuniformity before curing. Such methods have the disadvantages of requiring uniformity measurement on each tire, requiring a corrective procedure that is specific for each tire, and the inability to detect/correct nonuniformities that arise during molding.

SUMMARY OF THE INVENTION

The overall object of the present invention is to provide both method and apparatus for a constrained post cure inflation (CPCI) process, to be applied to a tire after removal from a tire curing mold. The CPCI process is intended to improve tire uniformity, footprint shape factor, and tread wear.

According to the invention, the method of constrained post cure inflation is applied to a tire having beads, a carcass with ply cords, an axis of rotation, and a tread (the tread having an equatorial plane). The inventive method comprises the steps of:

1) initiating the method on the tire after the tire has been removed from a tire curing mold;
2) providing 360 degree circumferential tread restraint which holds the tread in an ideal tread shape, concentric to the axis of rotation and nominally perpendicular to the equatorial plane;
3) sealingly holding the beads concentric to, and equidistant from, the axis of rotation, and symmetrically spaced about the equatorial plane; and
4) inflating the tire to a controlled pressure, and holding the controlled pressure for a controlled time while the tread is restrained and the beads are sealingly held.

According to the inventive method, the method initiation may be soon enough after the tire has been removed from a tire curing mold so that the ply cords are still above a glass transition temperature of the ply cord material.

According to an optional step in the inventive method, before the end of the controlled time, the ply cords are cooled below a glass transition temperature of the ply cord material. Alternatively, the method comprises holding the controlled pressure for a controlled time long enough for the ply cords to cool below a glass transition temperature of the ply cord material.

According to the inventive method, an optional additional step comprises heating the tire before the inflating step (4).

According to a feature of the inventive method including the optional heating step, the method further comprises: during the heating step, heating the tire to a controlled temperature above a glass transition temperature of the ply cord material. Also, optionally before the end of the controlled time, cooling the tire below the glass transition temperature of the ply cord material. The controlled temperature may be between approximately 100 degrees F and approximately 300 degrees F, and/or the controlled temperature may be determined by a magnitude of one or more anticipated tire uniformity defects.

According to a feature of the inventive method including the optional heating step, a location on the tire for heating during the heating step is determined by a location and type of one or more anticipated tire uniformity defects.

According to a feature of the inventive method including the optional heating step, the controlled time and/or the controlled pressure is determined by a magnitude of one or more anticipated tire uniformity defects.

According to a feature of the inventive method including the optional heating step, the controlled pressure is approximately equal to a normal inflation pressure for the tire.

According to the inventive method, the controlled pressure is determined by a magnitude of one or more anticipated tire uniformity defects. The controlled pressure may be between approximately 20 pounds per square inch gauge (psig) and approximately 80 psig.

According to the inventive method, the controlled time is determined by a magnitude of one or more anticipated tire uniformity defects. The controlled time may be between approximately 15 minutes and approximately 65 minutes and/or between 1 and 4 cycle times of the tire curing mold, preferably twice the cycle time of the tire curing mold.

According to the invention, an apparatus (a CPCI device) is provided for implementing the inventive method, i.e., for constrained post cure inflation of a tire having beads, an axis of rotation, and a tread having an equatorial plane; wherein the apparatus comprises:

a) means for providing 360 degree circumferential tread restraint which holds the tread in an ideal tread shape, concentric to the axis of rotation and nominally perpendicular to the equatorial plane;
b) means for sealingly holding the beads concentric to, and equidistant from, the axis of rotation, and symmetrically spaced about the equatorial plane; and
c) means for inflating the tire to a controlled pressure, and holding the controlled pressure for a controlled time while the tread is restrained and the beads are sealingly held.

According to the invention, the apparatus optionally includes:

d) means for heating the tire, and/or means for cooling the tire.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity. For illustrative clarity, the cross-sectional views presented herein may be in the form of "near-sighted" cross-sectional views, omitting certain background lines that would otherwise be visible in a true cross-sectional view.

In the drawings, the hundredth's place of each reference number usually matches the figure number, and similar elements are usually referred to by similar reference numbers. For example, element 199 in FIG. 1 and element 299 in FIG. 2 might indicate corresponding or similar elements.

The same element appearing in different figures might be given the same reference number in all figures. In a single drawing, similar elements may be assigned the same number. For example, both beads of the same tire may be assigned the same number. In some cases, similar (including identical) elements may be referred to with similar numbers in a single drawing. For example, each of a plurality of elements 199 may be referred to individually as 199a, 199b, 199c, etc., and may be referred to in common as 199 or as 199a–199c (meaning 199a to 199c).

Figure 1:
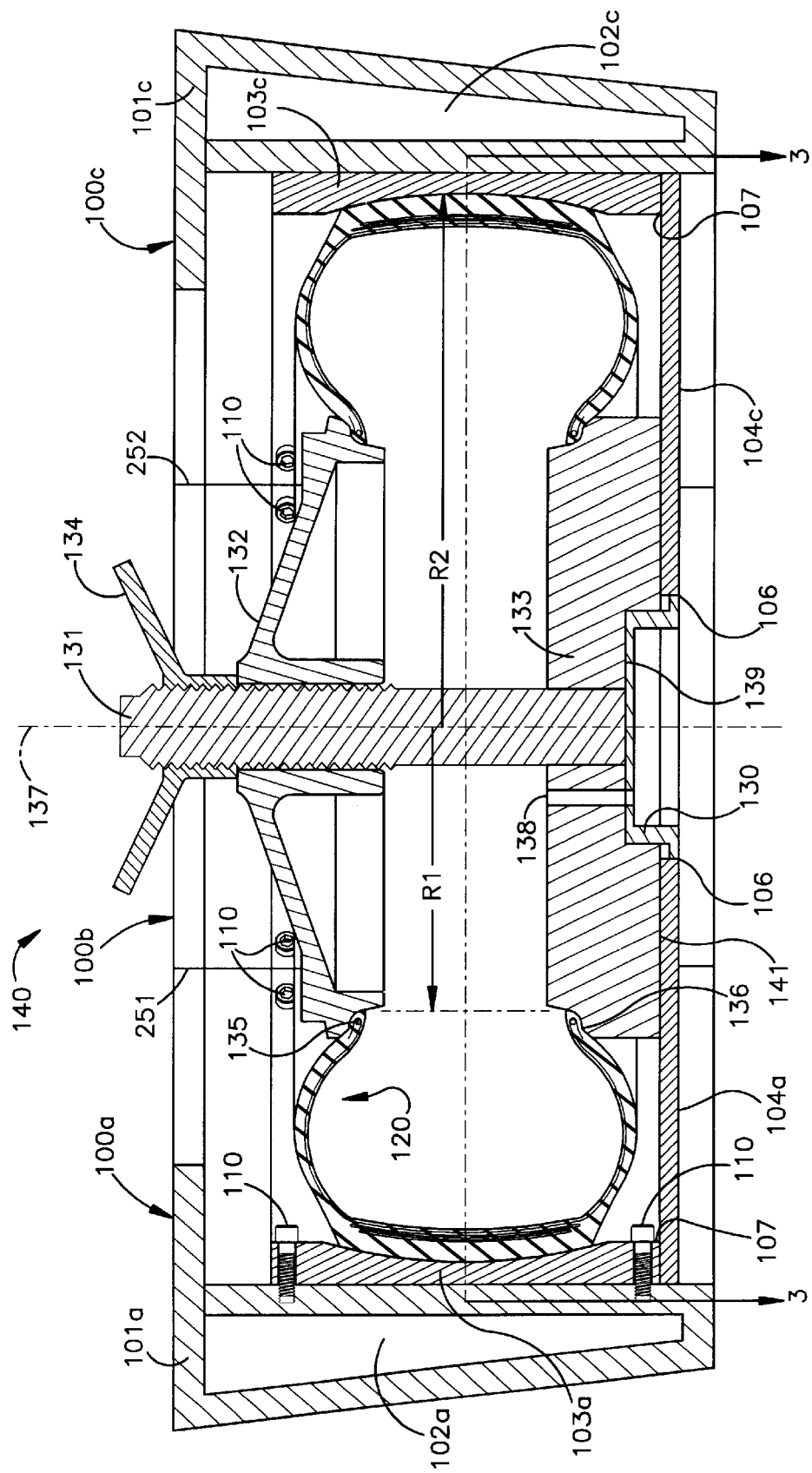
Figure 1A:
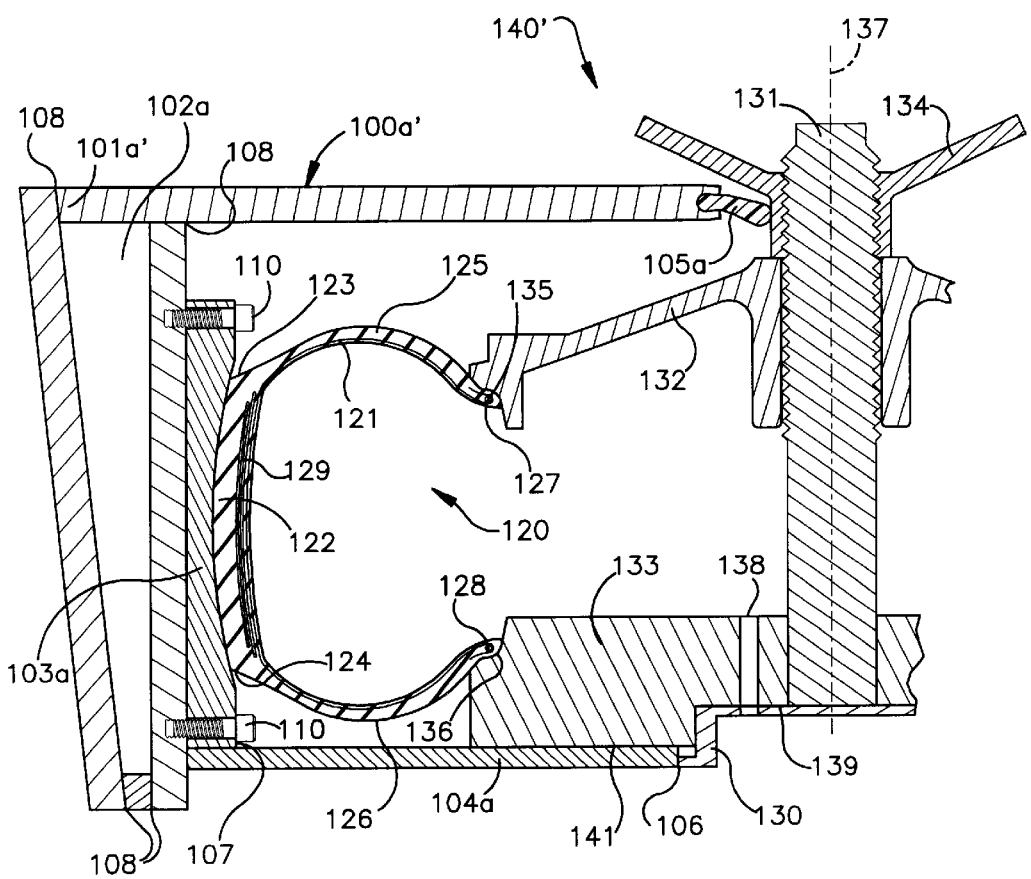
Figure 1B:
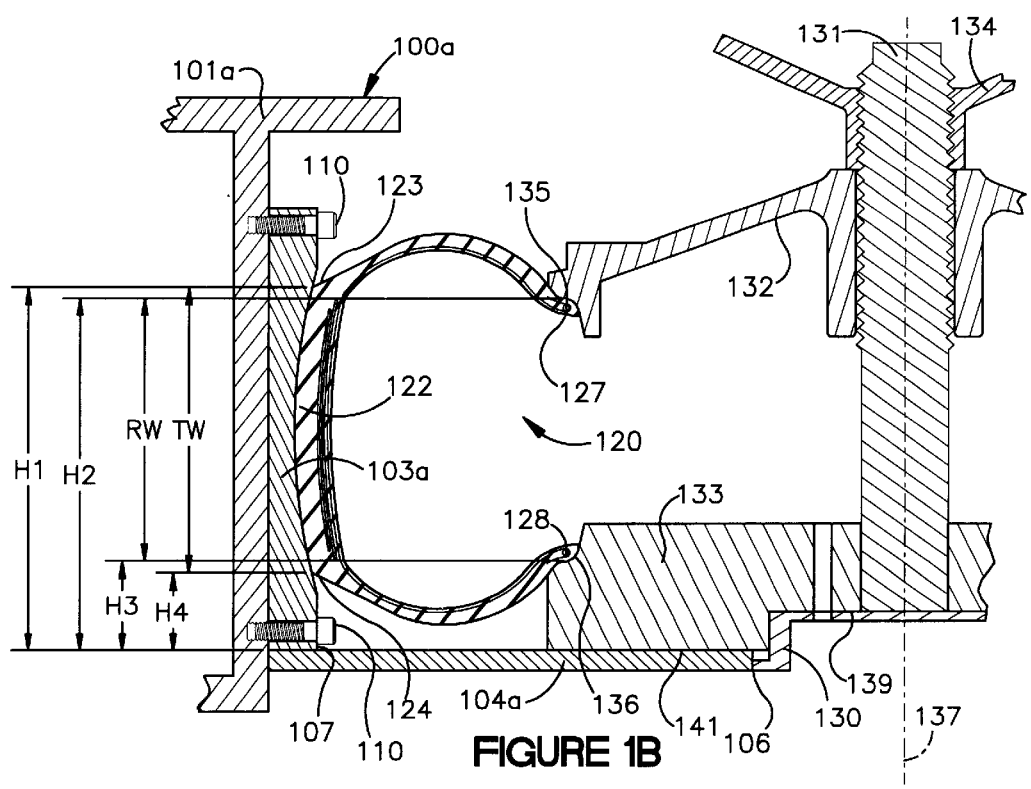
Figure 1C:
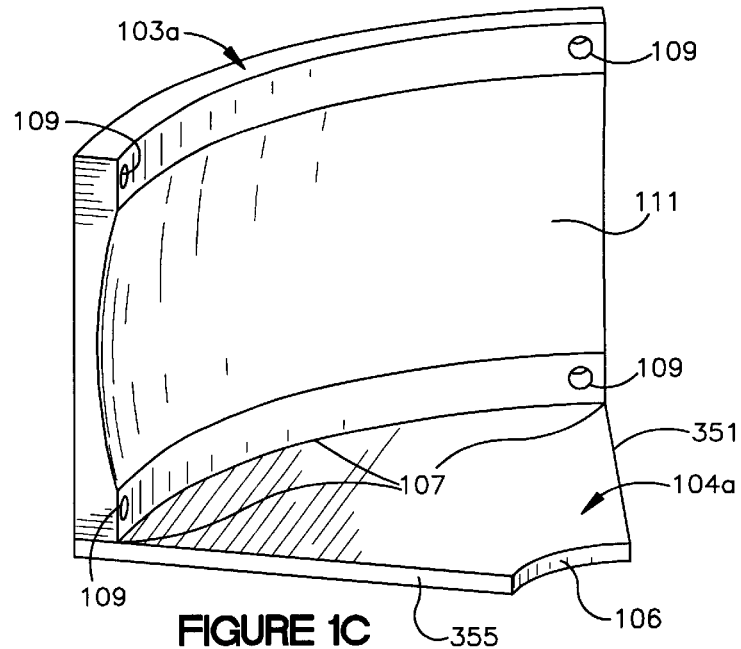
Figure 2:
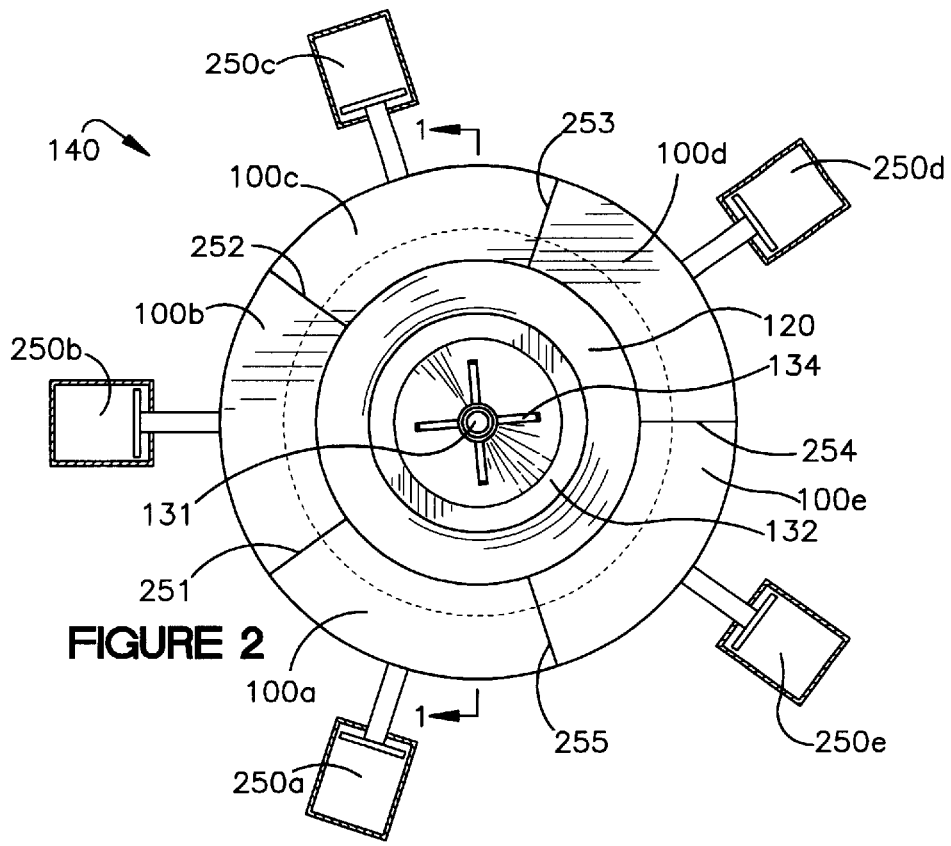
Figure 2A:
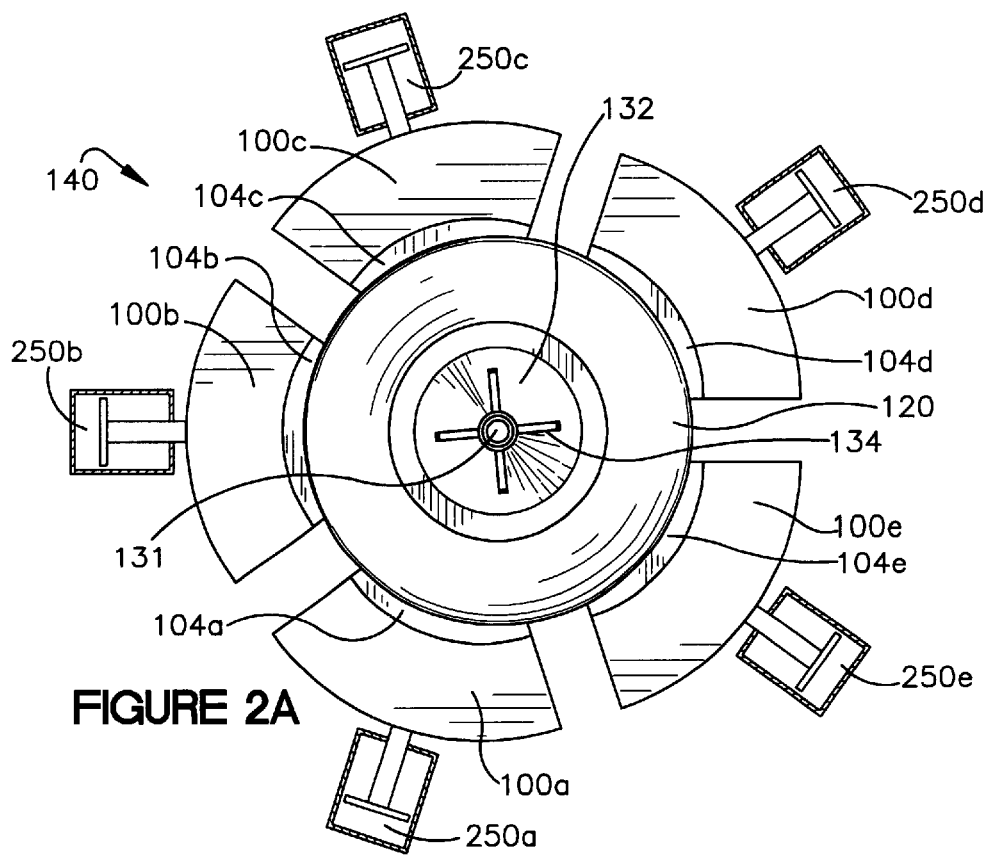
Figure 3:
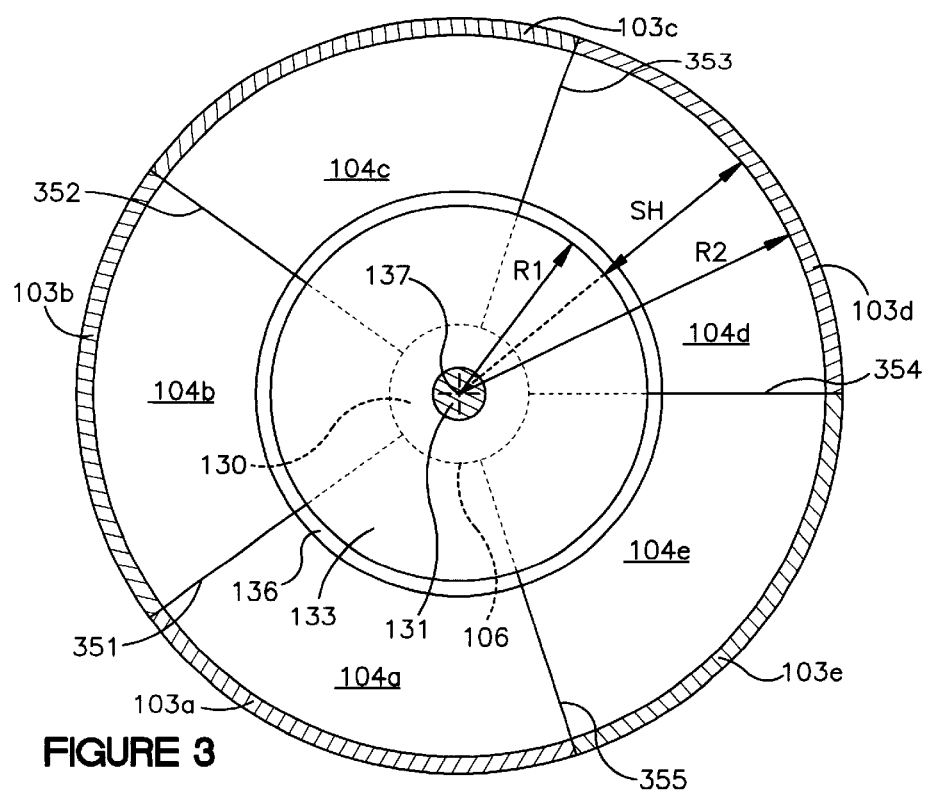
Figure 4A:
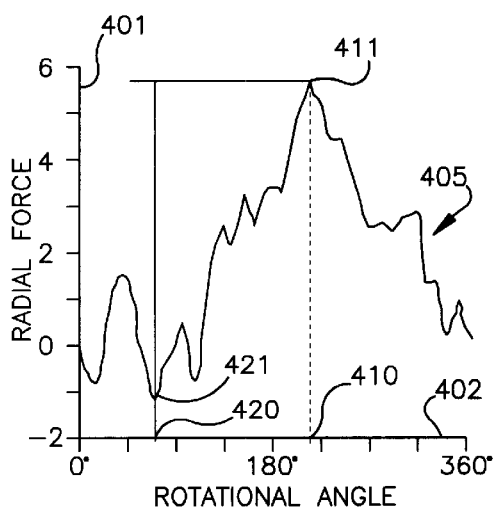
Figure 4B:
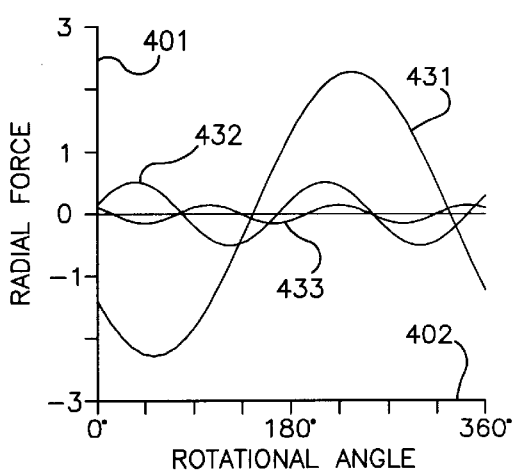
Figure 5:
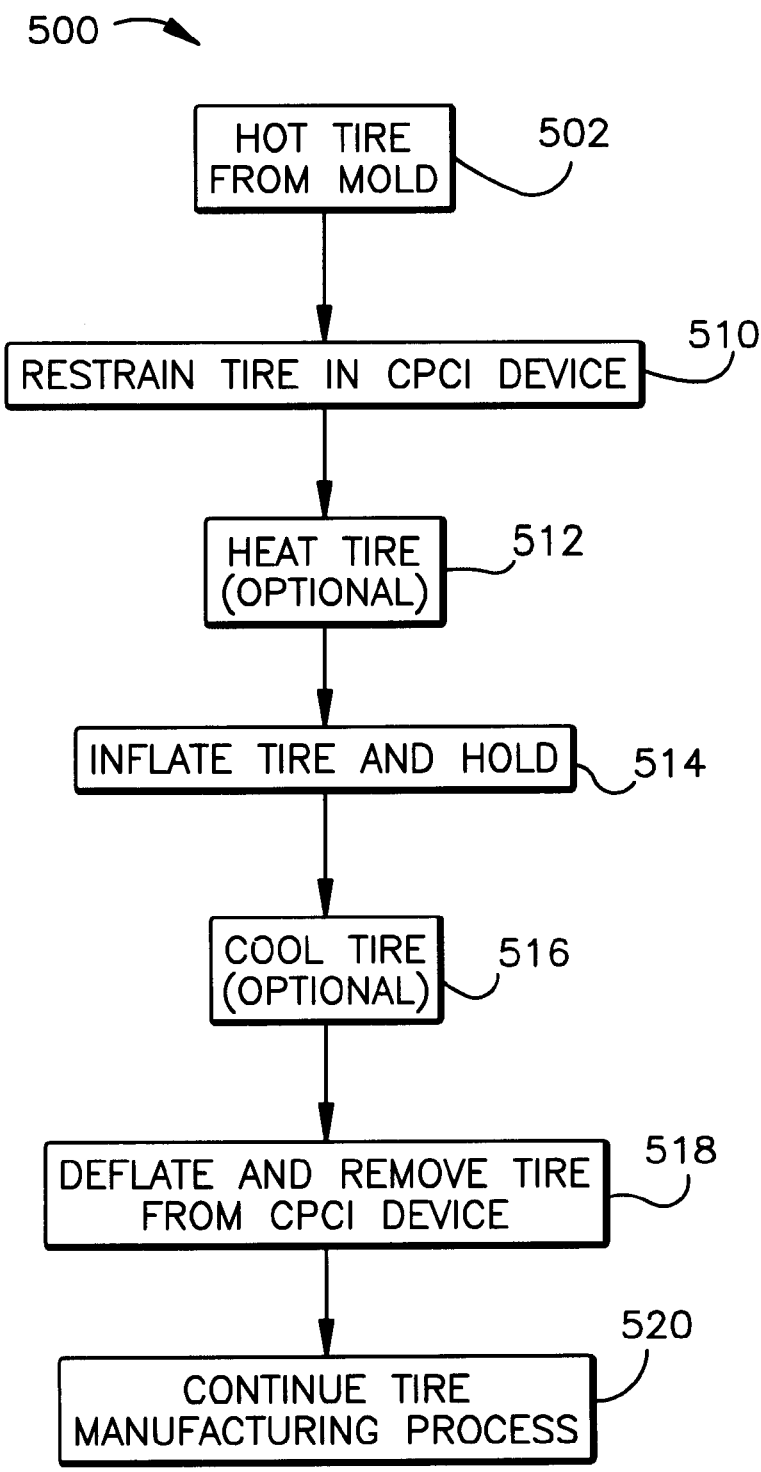

The structure, operation, and advantages of the invention will become further apparent upon consideration of the following description taken in conjunction with the accompanying drawings, wherein:

FIG. 1 is a cross-sectional side view of a tire in an embodiment of a constrained post cure inflation (CPCI) device, taken along the line 1—1 shown in FIG. 2, according to the invention;

FIG. 1A is a near-sighted cross-sectional side view of a tire in a portion of a second embodiment of a CPCI device, according to the invention;

FIG. 1B is a near-sighted cross-sectional side view of a tire in a portion of the CPCI device of FIG. 1, showing various dimensions, according to the invention;

FIG. 1C is a perspective view of a tread plate and bottom plate assembly, according to the invention;

FIG. 2 is a perspective top view of the CPCI device of FIG. 1, with the restraint segments closed, according to the invention;

FIG. 2A is a perspective top view of the CPCI device of FIG. 1, with the restraint segments opened, according to the invention;

FIG. 3 is a cross-sectional top view of parts of a CPCI device (tire removed), taken along the line 3—3 shown in FIG. 1, according to the invention;

FIG. 4A is a graph of a composite signal output from a tire uniformity machine measuring radial force variation;

FIG. 4B is a graph of three harmonics derived by decomposing the composite signal of FIG. 4A; and FIG. 5 is a flow chart for a method of constrained post cure inflation according to the invention.

DEFINITIONS

Directions

"Axial" and "lateral" refer to the direction parallel to the tire axis.

"Circumferential" means extending around a circumference, and typically around the tire's circumference.

"Meridional" refers to a tire cross-section cut along a plane that includes the tire axis.

"Radial" and "radially" refer to directions radially outward from, and hence perpendicular to, the tire axis.

Tire Components

"Apex" is a cross-sectionally triangular elastomeric filler located radially outward from the bead.

"Bead" is generally an inextensible annular cable of steel filaments within a rubber matrix, for tightly securing the tire to the rim.

"Belt structure" or "belts" means two or more annular layers of parallel cords underlying the tread.

"Carcass" is the structure that generally includes the beads, plies, innerliner and sidewalls.

"Cord" is a reinforcement strand, including fibers, metal or fabric, with which the plies and belts are reinforced.

"Cure" means vulcanize.

"Equatorial Plane" is a plane perpendicular to the tire axis and passing through the center of the tread.

"Equator" is the line formed at the junction of the equatorial plane and the tread outside surface.

"Green" means comprising curable rubber that is as yet uncured.

"Innerliner" is an air-impermeable rubber layer forming the tire's inner surface.

"Ply" is a layer of synthetic or steel cords in a rubber matrix, that extends between and typically wraps around the two beads.

"Radial ply tire" means a belted or circumferentially-restricted pneumatic tire having a generally radial ply.

"Rubber" herein means "elastomer", which has (or has upon curing) rubbery properties.

"Shoulder" is a corner portion of a tire where the surfaces of the tread and sidewall meet.

"Sidewall" is a side portion of a tire between the tread and the bead.

"Tire axis" is the tire's axis of rotation.

"Footprint" is the area of contact between a surface and the tread of a stationary tire resting on the surface.

Uniformity Characteristics

"Uniformity characteristic" is a measure of tire uniformity in a prescribed direction or plane which is measured under prescribed tire testing conditions.

"Dimensional nonuniformities" are asymmetries (nonuniformities) that are measurable when the tire is at rest.

"Dynamic nonuniformities" are asymmetries that are manifested when the tire is rotating.

"Radial runout" is a dimensional nonuniformity referring to the tread radius being asymmetric around its circumference (either out-of-round or not concentric around the tire axis).

"Radial force variation" is a dynamic nonuniformity referring to the tire's radial force being asymmetric around the tire's circumference, causing vertical vibration during driving.

"Lateral force variation" is a dynamic nonuniformity referring to the tire's lateral (axial) force being asymmetric around its circumference, causing lateral vibration (e.g., wobbling) during driving.

"Conicity" is a nonuniformity referring to the tread's meridional contour being asymmetric, causing a lateral (i.e., steering) force in the same lateral direction independent of the direction of tire rotation.

"Tangential force variation" is the nonuniform rotation of the tire's outer surface relative to the rotation of the tire's bead area.

"Footprint shape factor (FSF)" is a numeric indication of the footprint shape, obtained by dividing the circumferential length of the center of the footprint by the average circumferential length of the axially outer edges of the footprint. A rectangular/square footprint shape will have an FSF of 1.0. Larger numbers indicate oval/round footprint shapes, and numbers smaller than 1.0 indicate a "bow-tie" footprint shape.

DETAILED DESCRIPTION OF THE INVENTION

The present invention is intended to provide method and apparatus for a constrained post cure inflation (CPCI) process to be applied to a tire after removal from a tire curing mold. The CPCI process is intended to improve tire uniformity, footprint shape factor, and tread wear. The inventive methods/apparatus have been determined to be most beneficial for tires having polyester or other synthetic ply cords, especially in radial ply tires, but are also expected to benefit other tire constructions, and are therefore not limited in scope to any particular tire construction.

It should be noted that a tire is generally removed from the tire curing mold while it is still hot. Although subsequent treatments of the removed tire are referred to as "post cure", it is generally known that the tire is actually still continuing to cure as it cools down outside the mold. As mentioned in the background description of prior art hereinabove, a known procedure is "post cure inflation" where, upon removing the tire from the curing mold, the tire is essentially immediately placed on a stand which allows the tire to be inflated, and then held at pressure as the cooling continues. Although it can be seen that this process allows ply cords in the carcass to stretch in a way which promotes uniformity around the circumference of the tire, it does not prevent radial growth and it does not affect sidewall vs. sidewall uniformity (which affects conicity). Furthermore, it does not provide any means for controlling the tread shape.

The present invention addresses various deficiencies of the post cure inflation process by providing a specially-shaped constraining device (the CPCI device), and by employing a method which includes post cure inflation of a tire within the CPCI device. It is known that for a curved wall of an inflated container (e.g., the sidewall of a pneumatic tire), the tension "T" is approximately $$T = P \times R$$

where "P" is the pressure of the inflation air, and "R" is the radius of curvature of the sidewall. By constraining the tire tread during post cure inflation, any ply cords which are relatively shorter than other ply cords in the tire sidewall will have a larger radius of curvature R, and therefore will be placed under a greater tension T than the other ply cords. Because the tire is hot, the shorter cords under greater tension should stretch and/or pull around the beads (moving within the uncured rubber matrix) more than the other cords, thereby equalizing ply cord properties in all parts of the tire. As the tire cools down and completes curing, the equalized ply cord properties will be "locked in", resulting in a more-uniform tire. As described hereinbelow, the shape and construction of the constraining CPCI device provides additional benefits having a positive effect on the tire footprint and on various tire uniformity characteristics, such as conicity.

In general, the inventive method is believed to substantially correct or at least improve (partially correct) any tire nonuniformity which is related to nonuniform ply stress and/or ply cord length, as opposed to balance problems such as nonuniform distribution of tire material, for example. Substantially or partially correctable tire nonuniformities include all harmonics of radial force variation, lateral force variation, conicity, and possibly tangential force variation.

The inventive method will be described first, with reference to one or more embodiments of a constrained post cure inflation device (CPCI device), i.e., the inventive apparatus, according to the invention. Although the CPCI device will be described in detail hereinbelow, a brief description of the CPCI device will assist in understanding the description of the inventive method. The CPCI device 140, 140' and portions thereof are illustrated in several different views in the drawings of FIGS. 1 to 3 (1, 1A, 1B, 1C, 2, 2A, and 3). Major features of the CPCI device 140, 140' are a center post 131 with a central axis 137 (which is also an axis of rotation for the CPCI device parts and a tire 120 which is placed into the CPCI device 140, 140'); restraint segments 100, 100', tread plates 103, and bead rings 132, 133 having bead seats 135, 136 respectively. The tire 120 which is illustrated in several of the drawings, generally has common features including beads 127, 128; sidewalls 125, 126; a tread 122 having shoulders 123, 124 and a belt package 129; and one or more plies 121 having ply cords (not shown).

FIG. 5 illustrates the inventive method 500 which describes a process which starts (starting step 502) with a nominally cured tire 120 which is still hot after being removed from a tire curing mold (not illustrated).

In step 510, the tire 120 is placed into a restraining CPCI device such as the embodiments 140 or 140' described in detail hereinbelow. The CPCI device 140, 140' must be suitably sized and adjusted to match the size and type of tire which is undergoing the CPCI method 500. The main purpose of the CPCI device 140, 140' is to facilitate inflating the tire 120 against a 360 degree circumferential tread restraint (e.g., 103) which holds the tire's tread 122 in an ideal tread shape, concentric to the tire's axis of rotation 137, and which simultaneously sealingly holds the tire's beads 127, 128 concentric to the tire's axis of rotation 137, and symmetrically spaced about the equatorial plane of the tire's tread 122. Individual ply cords in the plies 121 of the tire 120 may be different because they are of different lengths or because they possess different tensile/elastic properties, either of which will cause them to react differently when the tire 120 is inflated in normal use. Inflation of the tire 120 in the CPCI device 140, 140' causes the plies 121 in the sidewalls 125, 126 to stretch freely under the same load, with radial growth limited to a constant radius by the tread restraint 103. Ply cords with different properties will stretch more or less to account for those differences, thereby normalizing the cord properties around the tire 120, and orienting the ply cords to a uniform loaded radius. The amount of inflation pressure is preferably controlled to a pressure value empirically determined to be most effective for any given tire 120. Likewise, the time span for holding the inflation at the controlled pressure is controlled to a time value empirically determined to be most effective for any given tire 120 at a given controlled pressure.

If the ply cords are heated (optional step 512) before and/or during inflation in the CPCI device 140, 140', the ply stretching process is enhanced, particularly for synthetic ply cords including fibers such as polyester, for example. In the case of synthetic fibers, heating is preferably to a controlled temperature which is above the glass transition temperature of the fiber (e.g., between approximately 100 and approximately 300 degrees F). The heating step 512 is optional, and is generally not needed as long as the tire 120 is placed into the CPCI device 140, 140' immediately after removal from the tire curing mold. Furthermore, by cooling (optional step 516) the fibers back down below the glass transition temperature of the fiber before deflating the tire 120, the fibers (ply cords) should solidify with more or less permanently normalized stresses and properties.

It should be noted that the ply cord properties are corrected for a loaded tire 120, i.e., a tire 120 which is under pressure and which is forced against a simulated road surface. This not only corrects nonuniform ply stresses, but also orients the tire 120 and cords to tune the footprint (i.e., optimize the footprint shape factor) of the tire 120 at operating loads. Referring to FIGS. 1 to 1C (1, 1A, 1B, 1C), in order to simulate a road surface simultaneously pressing against the tire tread 122 at all points of the 360 degree tread circumference, the tread contacting surface 111 of the tread restraint (e.g., segmented tread plates 103 of the restraint segments 100) has an "ideal shape" which closely matches the ideal contour of the tread 122 of an inflated tire 120. The idea is to make the tread contacting surface 111 as flat as possible (like a road surface) but still touching the entire ground contacting (footprint) portion of the inflated tire's tread 122. The tread plate 103 surface 111 must match the typically curved contour of the inflated tire's tread 122, because in order to completely flatten the entire footprint area of the tread 122 simultaneously around the entire circumference, the tire belt package 129 would have to buckle circumferentially (such as when one squeezes a soda can). A further characteristic of the ideal shape for the tread 122 is that the tread 122 from shoulder 123 to shoulder 124 should be aligned properly with the beads 127, 128 around the entire circumference of the tire 120, i.e., the beads 127, 128 should be symmetrically spaced about the equatorial plane of the tread 122. Finally, the ideal tread shape has the characteristic of nominal perpendicularity to the equatorial plane, such that even if the tread 122 surface is slightly curved as explained hereinabove, the tread surface will be symmetric about the equatorial plane, with the tangent to the tread surface being substantially perpendicular to the equatorial plane where the equatorial plane intersects the tread surface (at the equator), and also the tread shoulders 123, 124 are radially equidistant from the tire axis of rotation (as are the beads 127, 128 which can be used to determine the tire's axis of rotation).

Thus, an optimum CPCI process 500 is preferably to restrain (step 510) the tire 120 in the CPCI device 140, 140' as soon as possible after removing the tire 120 from the tire curing mold (step 502); optionally heat (step 512) the tire 120 to a temperature above the fiber's glass transition temperature if the tire 120 is not at a suitable temperature when it is to be placed into the CPCI device 140, 140'; inflate the tire 120 and hold it at a controlled pressure for a controlled time (step 514); cool down (step 516) the tire 120 (preferably below the fiber's glass transition temperature) before the end of the controlled time; and then deflate and remove the tire 120 (step 518) from the CPCI device 140, 140'; and finally to send the tire 120 on to continue the tire manufacturing process (step 520) including, for example, TUM testing and tire uniformity quality control and/or correction. The temperatures described above may be considered "controlled" temperatures whether they are achieved by optional heating and/or cooling, or simply by appropriately timing the placement of the tire 120 into the CPCI device when it is still hot enough and by appropriately timing the removal of the tire 120 when it has sufficiently cooled.

Exemplary controlled values during the CPCI process 500 are: controlled time between approximately 15 minutes and approximately 65 minutes (e.g., from 1 to 4 cycle times for a typical tire curing mold); controlled pressure between approximately 20 pounds per square inch gauge (psig) and approximately 80 psig; and controlled temperature between approximately 100 degrees F and approximately 300 degrees F. The controlled values are interrelated and generally are empirically determined optimum values for a given tire design. Furthermore, the controlled values can be adjusted as determined by an average magnitude and/or non-randomly-occurring type of tire uniformity defect (out-of-spec tire uniformity characteristic) which may be noticed during TUM testing later in the manufacturing process. For example, higher values of one or more of the three controlled values (time, pressure, temperature) may be needed to prevent tire uniformity test defects with larger magnitudes (e.g., a higher radial force measurement for the peak 411 of the force variation composite curve 405 in FIG. 4A).

As mentioned hereinabove, the heating step 512 is optional and depends upon the temperature of the tires being placed into the CPCI device 140, 140'. If needed, the tire heating 512 may take place either before or after placing the tire 120 into the CPCI device 140, 140' and/or restraining the tire 120 in the CPCI device 140, 140' (step 510). Tire heating 512 may also be delayed to occur during the inflation and hold step 514, either during the inflation or during the holding period. A variety of known techniques may be employed to heat the tire 120, for example: heating in an autoclave (the method used in the inventor's trials) or a microwave oven; inflating the tire 120 with steam or hot water; or introducing steam around the tire 120 while it is enclosed within the CPCI device (e.g., 140' in FIG. 1A). Heating may even be only partial, such as heating the tread area 122 with a water/steam jacket (e.g., 102); or such as heating certain locations on the tire sidewall(s) 125, 126 and tread 122 wherein the location of heating on the tire 120 is determined by the location and type of anticipated tire uniformity test defects. Such partial heating is accomplished, for example, by steam jets.

The cooling step 516 is likewise optional, even if the tire 120 is heated. Preferably a heated tire 120 is cooled (either forced or allowed time to cool) to a certain temperature before the end of the controlled time of holding at pressure, but it may also be allowed or forced to cool after the tire has been deflated and/or removed from the CPCI device 140, 140' (step 518). Forced cooling may be accomplished by a variety of known techniques, such as: cool air/water jets, or water jackets (e.g., 102 and/or the area within the walls of the CPCI device 140').

In order to implement the inventive method 500 as described hereinabove, a CPCI device 140, 140' must be employed, wherein the CPCI device 140, 140' has certain characteristics (capabilities) which are the subject of the present invention, i.e., the inventive CPCI device 140, 140'.

The necessary characteristics are that the CPCI device:

a) provides 360 degree circumferential tread restraint which holds the tire's tread in an ideal tread shape, concentric to the tire's axis of rotation and nominally perpendicular to the tire's equatorial plane;

b) sealingly holds the tire's beads concentric to, and equidistant from, the tire's axis of rotation, and symmetrically spaced about the equatorial plane of the tire's tread;

c) provides for inflating the tire to a controlled pressure, and holding the controlled pressure for a controlled time while the tread is restrained and the beads are sealingly held; and d) (optional) provides for heating and/or cooling of the tire, either as a whole or in part.

Any apparatus (device) utilized for carrying out the steps of the inventive method 500, particularly if that apparatus has the certain characteristics (a) to (c) (optionally d) listed hereinabove, is considered within the scope of the present invention. An exemplary embodiment 140 and an exemplary alternate embodiment 140' are presented hereinbelow with reference to the drawings of FIGS. 1, 1A, 1B, 1C, 2, 2A, and 3 (FIGS. 1–3). Those skilled in the art may recognize that these embodiments are conveniently but not necessarily formed by modifying a Marangoni Retread Press, and will no doubt find other ways to fabricate a CPCI device having the CPCI device characteristics and capabilities listed hereinabove and therefore suitable for carrying out the steps of the inventive method 500 according to this invention. It should also be noted that the CPCI device 140, 140' described herein is also well-suited for tire correction at other appropriate points in the tire manufacturing process. In particular, the CPCI device 140, 140' can be used on tires after they have been tested for tire uniformity on a TUM. Tires which failed the tire uniformity test could be selected for correction using the CPCI device 140, 140' and a method similar to the inventive method 500.

FIG. 1 is a cross-sectional side view of a tire 120 in an embodiment of a constrained post cure inflation (CPCI) device 140, taken along the line 1—1 shown in FIG. 2. FIGS. 2 and 2A are perspective top views of the CPCI device 140 of FIG. 1. FIG. 2A shows the CPCI device 140 opened so that the tire 120 may be inserted or removed from the CPCI device 140, and FIG. 2 shows the CPCI device 140 closed around the tire 120 as in FIG. 1, thereby restraining the tire 120. It can be seen that there are five restraint segments 100 (100a–100e; i.e., 100a, 100b, 100c, 100d, 100e) which join along joints: 251 (between segments 100a and 100b), 252 (between segments 100b and 100c), 253 (between segments 100c and 100d), 254 (between segments 100d and 100e), and 255 (between segments 100e and 100a). The restraint segments 100 are opened/closed by pistons 250 with each piston (e.g., 250a) dedicated to a corresponding restraint segment (e.g., 100a). The quantity of segments 100 (and pistons 250) is not important to the invention as long as there are enough segments to facilitate opening the CPCI device 140, 140' sufficiently to allow insertion/removal of the tire 120. Since the tread restraint is intended to be around the full circumference of the tire (characteristic a), it is generally simpler to insert the tire into the restraint if the restraint opens up, such as the five-segment restraint 100 illustrated herein.

Referring to FIGS. 1–3, the restraint segments 100 (e.g., 100a, 100c shown in cross-section) have a rigid, preferably metal, frame 101 suitable for withstanding the forces employed in the CPCI process 500 without allowing any significant shape change or movement out of position for the restraint segments 100 during the CPCI process 500. The frame 101 may have a chamber 102 (actually an artifact of the retread press) which can be used for heating and/or cooling of the tire 120 or at least the tire tread 122. As shown for the frame 100a' in FIG. 1A, the frame 100 can be fabricated from multiple pieces of metal which are welded together at joints 108. Comparing the frame 100a of the CPCI device 140 in FIG. 1 to the frame 100a' of the CPCI device 140' (alternate embodiment) in FIG. 1A, one can see that the major difference is that the frame 100a' extends farther than the frame 100a across the top of the CPCI device 140', far enough to seal, by means of a gasket 105a (preferably rubber), against a center post 131, a locknut 134 and/or a top bead ring 132. Thus the CPCI device 140' provides a sealed area surrounding the tire 120, thereby allowing heating and/or cooling media (e.g., steam, water, air) to be pumped around the tire 120 for heating and/or cooling purposes (optional characteristic (d)).

At the center of the CPCI device 140, 140' is a post 131 which is fixed and provides a central axial reference line 137 which is also the tire 120 axis of rotation (also designated 137) when the tire 120 is properly mounted in the CPCI device 140, 140'. The post 131 is affixed to a circular base 130 which is, in turn affixed to a rigid machine base (not shown). An upper surface 139 of the base 130 mates with a movable bottom bead ring 133 which slidingly fits over the post 131 and rests on the base 130 in a position which is registered radially by a close fit around the post 131, and is further registered vertically by resting on the surface 139 of the base 130. The bottom bead ring 133 is designed so that a bottom bead seat 136 is formed at a rim radius "R1" which is held concentric to the post 131. Likewise, a movable top bead ring 132 slidingly fits over the post 131, registered radially by a close fit around the post 131, and is designed so that a top bead seat 135 is formed at a rim radius R1 which is held concentric to the post 131. The vertical position of the top bead ring is controlled by a locknut 134 (threaded onto the post 131) which has means (such as a scale, not shown) for determining a fixed height suitable for a given tire 120, such that, when the tire 120 is inflated, the top bead ring 132 is pressed up against the locknut 134 (as shown) where the top bead ring 132 is held in position with a rim width "RW" measured between the top and bottom bead seats, 135 and 136, respectively. The bead seats 135, 136 are preferably shaped similarly to a rim suitable for the tire 120, are formed at a radius R1 (also a rim height) which is suitable for the tire 120, and are preferably spaced apart by the rim width RW which is approximately equal to the width of a rim generally used with the tire 120. There is an air passage 138 provided through the base 130 and bottom bead ring 133 to facilitate inflation of the tire 120, and suitable air seals (not shown) such as gaskets are provided between the bead rings 132, 133 and the post 131 so as to facilitate inflation of the tire 120. It can be seen that the central portion of the CPCI device 140, 140' is designed to meet the specifications of characteristics (b) and (c) hereinabove.

In order to satisfy the remaining specifications of characteristics (a) and (b) hereinabove, a specially designed tread plate 103 is provided. Referring to FIGS. 1, 1A, 1B, 1C, and 3 and especially referring to the perspective view in FIG. 1C, each tread plate 103 (e.g., 103a) is preferably attached (by welds 107 for example) to a corresponding bottom plate segment 104 (e.g., 104a), and has mounting holes 109 as needed around the periphery of the tread plate 103 for securing, by means of bolts 110, the tread plate 103 to the corresponding frame 101 (e.g., 101a) of the corresponding restraint segment 100 (e.g., 100a). As seen in the FIG. 3 cross-sectional view of the bottom of the CPCI device 140 (or 140'), each bottom plate segment 104 is bounded by radial edge lines which mate against adjacent bottom plate segments 104 along the appropriate bottom plate joints 351–355. It can be seen that there are five bottom plate segments 104 (104a–104e) which join along joints 351 (between segments 104a and 104b), 352 (between segments 104b and 104c), 353 (between segments 104c and 104d), 354 (between segments 104d and 104e), and 355 (between segments 104e and 104a). Particularly in the case of the CPCI device 140', which is designed to confine heating and/or cooling media around the tire 120, the segment joints 251–255 and 351–355 are preferably designed to seal together appropriately when the CPCI device 140, 140' is closed by the pistons 250. Another edge line for the bottom plate segments is the arc-shaped edge 106 which is shaped to mate against the circular periphery of the base 130. Thus the mating of the bottom plate segments 104 with the base 130 along the circular line 106 determines a stopping point (registration point) which is sized appropriately to place the tread plates 103 at a radial distance "R2" (measured at the equator) suitable for restraining the tread in the ideal shape. Each tread plate 103 has a tread-contacting surface 111 which has been described hereinabove as having an "ideal shape." It can be seen from the forgoing discussion that this ideal shape includes being placed at the correct radial distance R2 (measured from the axis of rotation of the tire 120 to the surface of the tread 122, at the equator, when the tire 120 is restrained in a "loaded" condition for the entire 360 degree circumference of the tread 122). The tread plates 103 are also designed so that when they are positioned at the radius R2, the tread plates 103 mate each one to each adjacent one so that the tread contacting surface 111 is substantially uninterrupted and continuous around the entire 360 degree circumference of the tread 122. Furthermore, the bottom plate segments 104, the registration point 106, the base 130, and the tread plates 103 are designed and sized specifically for a given tire 120 size so that the tread contacting surface 111 is concentric to the axis of rotation 137 and nominally perpendicular to the equatorial plane.

Finally, the bottom bead ring 133 is shaped such that the ring 133 bottom surface is substantially flat and mates with the top surface of the bottom plate segments 104 along a planar surface which thereby forms a registration point 141 for the relative vertical positioning of the bottom plate segments 104 versus the bottom bead ring 133. Since the bottom plate segments 104 are attached to the tread plates 103, the registration point 141 effectively controls the relative positioning of the tread plates 103 (including the tread contacting surface 111) versus the bottom bead ring 133. The construction of the CPCI device 140, 140' is such that (for a tire 120 having a tread width TW measured between the two tire shoulders 123, 124): the bottom bead 128 is a distance "H3" from the registration point 141; the point where the tread width TW ends at the bottom tire shoulder 124 is held by the tread plates 103 (and generally curved tread contacting surface 111) at a distance "H4" from the registration point 141, thereby also holding the point where the tread width TW ends at the top tire shoulder 123 at a distance "H4" from the registration point 141; and the locknut 134 can be positioned so that the top bead 135 is caused to be a distance "H2" from the registration point 141, wherein the rim width "RW" resulting from subtracting distance H3 from distance H2 is symmetrically positioned relative to the tread width TW (i.e., H1 minus H2 approximately equals H3 minus H4), and preferably the rim width RW is substantially equal to the nominal rim width for a rim normally used with the tire 120.

The embodiments of the inventive CPCI device 140, 140' described hereinabove are designed to carry out the inventive CPCI method 500, thereby implementing the capabilities and characteristics (a) through (c) and optionally (d) described hereinabove. Although the CPCI device 140, 140' may be operated manually, it is preferable to provide a controller (not shown) for at least partially automating the operation of the CPCI device 140, 140'. Such a controller (e.g., a programmable logic controller "PLC") can be used to control the "controlled" times, pressures, and temperatures, for example. It can also automate the turning on/off of inflation air, heating steam, cooling water, and so on. The description hereinabove of controlled times, controlled pressures, and controlled temperatures assumes the presence of some sort of controller, whether it is a PLC or individual specialized controls as are well known in the relevant arts of machine and process control.

Tire manufacturing processes commonly include testing of assembled tires in a tire uniformity machine ("TUM", not shown) which yields a variety of tire uniformity measurements (e.g., radial force measurements illustrated by curves 405, 431, 432, 433 in FIGS. 4A–4B). If all of the tire uniformity measurements are within established acceptance limits, then the tire uniformity is considered acceptable. If one or more of the tire uniformity measurements are not within established acceptance limits, then the tire is rejected by the TUM due to tire uniformity defect(s). Often, secondary criteria are applied (by human or automated means) to determine if the rejected tire (uniformity) is correctable, and if so, various means for correction may be applied to the rejected tire. Obviously, it is desirable to avoid the necessity of added correction processes due to the time and effort involved, as well as due to the fact that not all defects are correctable. By applying the inventive CPCI method 500 to all tires as they are removed from the curing molds, it is believed possible to substantially correct or at least improve (partially correct) any tire nonuniformity which is related to nonuniform ply stress and/or ply cord length, thereby avoiding a number of tire uniformity defects including all harmonics of radial force variation, lateral force variation, conicity, and possibly tangential force variation.

The effectiveness of the CPCI method (process) 500 is indicated by the results of the following test on a P235/75R15 tire. The curing mold had a 16 minute cycle time per tire. Immediately upon removal from the curing mold, alternate tires 120 were placed into a CPCI device 140 having a 32 minute cycle time, controlled tire inflation pressure of 20 psig, and no forced heating or cooling. These "processed" tires 120 formed a processed tire group "B". The alternate tires which were not placed into the CPCI device 140 formed a control group "A" of un-processed tires. (In an actual manufacturing process, 100% of the tires could be processed with the above cycle times by utilizing two CPCI devices 140, 140' per tire curing mold.) There were 24 tires in the control tire group A (unprocessed), and 20 tires in the processed tire group B. After cooling to room temperature, all tires were tested in a TUM. In order to confirm the permanency of the effects of the CPCI process 500, all tires were then given a "break-in" run on a road wheel (200 miles at 50 miles per hour) followed by a second TUM test. Finally, all tires had their footprint shape factor determined at selected loads, both before and after the break-in run. The following tables summarize the results of this test, with force values reported in units of pounds force, and dimensions in inches:

| GROUP | AVERAGE | MAX VALUE | STD. DEV. | BREAK-IN CHANGE |
|---|---|---|---|---|
| RFV (composite radial force variation) | | | | |
| A | 16.33 | 35.0 | 6.30 | +0.1 |
| B | 13.70 | 21.0 | 3.12 | −0.1 |
| R1h (Radial force variation, first harmonic), "runout" | | | | |
| A | 9.00 | 30.0 | 6.72 | +0.5 |
| B | 6.72 | 14.0 | 3.73 | −0.4 |
| L1h (Lateral force variation, first harmonic) | | | | |
| A | 7.58 | 18.0 | 4.17 | +0.3 |
| B | 4.72 | 11.0 | 2.49 | +0.1 |
| Dimensional effects: section width, "SD" | | | | |
| A | 9.22 | — | — | +0.16 |
| B | 9.41 | — | — | +0.03 |
| Dimensional effects: outside tire diameter, "OD" | | | | |
| A | 29.11 | — | — | −0.01 |
| B | 29.06 | — | — | +0.01 |

It can be seen from these test results that both radial and lateral force variation results were improved by the CPCI process 500 compared to the results for unprocessed control tires (group A). Furthermore, the uniformity of the processed tires (group B) generally exhibited less changes after break-in than the unprocessed tires. The dimensional results show that the processed tires had minimal carcass growth, and equal or better consistency in dimensions after break-in when compared to the unprocessed tires. Finally, although not reported here in tabular form, the footprint shape factor measurements showed generally lower shape factors for the processed tires, both before and after break-in. This is evidence that the footprint shape factor is "tunable" through implementation of the CPCI method 500.

In summary, the described inventive method 500 and CPCI devices 140, 140' are expected to provide advantages and benefits in tire uniformity including conicity, radial, lateral, and tangential force variation, and also including tuning of the footprint (optimizing the footprint shape factor) of a loaded tire for improved tread wear. All tire uniformity improvements and footprint tuning are accomplished essentially simultaneously, without needing to know the location or magnitude of any potential tire uniformity defects.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. Method of constrained post cure inflation for a radial ply tire having beads, ply cords, and a tread; the method comprising the steps of:

initiating the method of constrained post cure inflation on the radial ply tire after the radial ply tire has been removed from a tire curing mold;

providing a constrained post cure inflation device having a 360 degree circumferential tread restraint device having a 360 degree tread restraint surface disposed at an equal radial distance from a central axis through the constrained post cure inflation device, the tread restraint surface being formed from a plurality of segmented tread restraint plates adapted to hold the tread of the tire in a predefined ideal tread shape, concentric to an axis of rotation and nominally perpendicular to an equatorial plane of the tire;

opening the plurality of segmented tread restraint plates radially outward from the central axis;

inserting the radial ply tire into the constrained post cure inflation device so that the beads are sealingly held concentric to, and equidistant from, the axis of rotation, and symmetrically spaced about the equatorial plane;

closing the plurality of segmented tread restraint plates radially inward toward the central axis;

inflating the tire to a controlled pressure to simultaneously press the tread of the tire against the 360 degree tread restraint surface; and holding the controlled pressure for a controlled time while at least a portion of the ply cords are at a controlled temperature above a glass transition temperature of the ply cord material so that the ply cord stresses are normalized.

2. Method according to claim 1, further comprising the step of:

initiating the method on the tire soon enough after the tire has been removed from a tire curing mold so that the ply cords are still above a glass transition temperature of the ply cord material.

3. Method according to claim 1, further comprising the step of:

before the end of the controlled time, cooling the ply cords below a glass transition temperature of the ply cord material.

4. Method according to claim 1, further comprising the step of:

holding the controlled pressure for a controlled time long enough for the ply cords to cool below a glass transition temperature of the ply cord material.

5. Method according to claim 1, further comprising the step of:

heating the tire to a controlled temperature above the glass transition temperature of the ply cord material before the inflating step.

6. Method according to claim 5, further comprising:

during the heating step, heating the tire to a controlled temperature between 100 degrees F. and 300 degrees F.

7. Method according to claim 5, further comprising:

during the heating step, heating the tire to a controlled temperature determined by a magnitude of one or more anticipated tire uniformity defects.

8. Method according to claim 5, further comprising:

determining a location on the tire for heating during the heating step according to the location and type of one or more anticipated tire uniformity defects.

9. Method according to claim 5, further comprising:

determining the controlled time according to the magnitude of one or more anticipated tire uniformity defects.

10. Method according to claim 5, further comprising:

determining the controlled pressure according to the magnitude of one or more anticipated tire uniformity defects.

11. Method according to claim 5, wherein:
the controlled pressure is approximately equal to a normal inflation pressure for the tire.

12. Method according to claim 1, further comprising:
determining the controlled pressure according to the magnitude of one or more anticipated tire uniformity defects.

13. Method according to claim 1, wherein:
the controlled pressure is between 20 psig and 80 psig.

14. Method according to claim 1, farther comprising:
determining the controlled time according to the magnitude of one or more anticipated tire uniformity defects.

15. Method according to claim 1, wherein:
the controlled time is between 15 minutes and 65 minutes.

16. Method according to claim 1, wherein:
the controlled time is between 1 and 4 cycle times of the tire curing mold.

17. Method according to claim 1, wherein:
the controlled time is twice the cycle time of the tire curing mold.

18. Method according to claim 1, further comprising the steps of:

heating only the tread such that a portion of the ply cords that is in the tread is held at the controlled temperature and the controlled pressure for a controlled time; and cooling only the tread such that the portion of the ply cords that is in the tread is cooled below the controlled temperature before un-inflating the tire.

19. Method according to claim 1, further comprising the step of forming the tread restraint surface from five or more segmented tread restraint plates.

* * * * *